United States Patent

Lai et al.

Patent Number: 5,322,663
Date of Patent: Jun. 21, 1994

[54] MOLDABLE CRYSTALLINE POLYESTER COMPOSITION

[75] Inventors: Choung-Houng Lai, Newtown, Pa.; Jean M. Brady, Hamilton, N.J.

[73] Assignee: Rohm and Haas Company, Philadelphia, Pa.

[21] Appl. No.: 66,736

[22] Filed: May 25, 1993

[30] Foreign Application Priority Data

Jul. 16, 1992 [GB] United Kingdom ............ 92/151695

[51] Int. Cl.$^5$ ............ C08L 67/02; C08L 51/04; C08K 3/22

[52] U.S. Cl. .................... 264/544; 264/148; 264/175; 264/210.1; 524/451; 524/504; 525/64; 525/67; 525/133; 525/148

[58] Field of Search ............ 525/64, 67, 133, 148; 524/504, 451; 264/148, 175, 210.1, 544

[56] References Cited

U.S. PATENT DOCUMENTS

| | | | |
|---|---|---|---|
| 3,562,200 | 2/1971 | Jones et al. | 260/40 |
| 3,960,807 | 6/1976 | McTaggart | 260/40 |
| 4,180,494 | 12/1979 | Fromuth et al. | 260/40 |
| 4,264,487 | 4/1981 | Fromuth | 260/40 |
| 4,463,121 | 7/1984 | Gartland | 524/291 |
| 4,482,672 | 11/1984 | Neuray et al. | 525/67 |
| 4,713,268 | 12/1987 | Carson | 428/35 |
| 5,008,333 | 4/1991 | Yates | 525/92 |
| 5,023,137 | 6/1991 | Smith | 428/34 |

FOREIGN PATENT DOCUMENTS

| | | |
|---|---|---|
| 110222 | 11/1983 | European Pat. Off. |
| 133993 | 3/1985 | European Pat. Off. |
| 488711 | 11/1991 | European Pat. Off. |
| 61-264045 | 5/1985 | Japan . |
| 264045 | 11/1986 | Japan ............ 525/133 |
| 9203505 | 8/1991 | PCT Int'l Appl. |
| 9315146 | 2/1993 | PCT Int'l Appl. |

Primary Examiner—David Buttner
Attorney, Agent, or Firm—Roger K. Graham

[57] ABSTRACT

A rapidly-crystallizing modified poly(ethylene terephthalate) contains an acrylic core/shell impact modifier, a small amount of a polycarbonate, and a small amount of a copolymer of ethylene with a vinyl or vinylidene monomer containing ester groups. Improved mold release and lessened plate-out are observed over other additive combinations.

17 Claims, No Drawings

MOLDABLE CRYSTALLINE POLYESTER COMPOSITION

SUMMARY OF THE INVENTION

Poly(ethylene terephthalate) modified with an impact modifier, a small amount of polycarbonate, and a nucleator is a rapidly-crystallizing tough molded or extruded material, whose surface and mold-release properties are enhanced by the presence of small amounts of ethylene/acrylate copolymers. Plate-out during processing also is reduced.

FIELD OF THE INVENTION

This invention is concerned with polyesters, such as poly(ethylene terephthalate), modified with impact modifiers, mold release agents, and nucleating agents, which exhibit improved resistance to plate-out on injection molding or extrusion.

Polymers and copolymers containing predominantly units derived from ethylene glycol and terephthalic acid, which we shall designate PET, when properly formulated, are attractive candidates for many packaging operations. One major aspect is in clear formulations where the polyester remains amorphous, such as in the packaging of water, carbonated beverages, and the like. A second aspect is when the polyester is crystallized, so as to attain a heat stability without distortion up to temperatures above 230 degrees C. The crystalline polymers in a practical aspect require one or more additives for improvement of impact strength, an additive to improve mold release or release from any contact with metal surfaces, and one or more additives known as "nucleating agents" which will control the rate and degree of crystallization during the molding process.

One solution to this problem has been offered by Carson, U.S. Pat. No. 4,713,268, where he teaches an acrylic core/shell impact modifier, suitably heat-stabilized, a small amount of polycarbonate, and a poly(alkylene terephthalate), preferably where the alkylene group is butylene, as a nucleator. Another formulation which offers lower cost is the use of a polyolefin, such as linear low density polyethylene (LLDPE), as a nucleating component of polyester blends (as taught in Gartland et al, U.S. Pat. No. 4,463,121). The polyolefin is also useful as a mold release agent; it is generally less effective as a nucleator than inorganic nucleators, such as talc.

When a polyolefin, such as LLDPE, is employed in combination with a mixture of polycarbonate and an acrylic core/shell modifier, under certain conditions of molding, such as extended runs or attempts to increase production rates by use of higher temperatures and faster mold cycles, the LLDPE will "plate-out", necessitating stopping or slowing the molding process to remove the separated polyolefin. A similar result is seen when such a formulation is extruded into sheet and then thermoformed into appropriate packaging articles. Plate-out is manifested by unattractive, dull surfaces, appearance of a film of polyolefin at the thermoforming rolls, or a slippery feel to the surface of the formed article.

We have now found that replacement of LLDPE with a copolymer of ethylene and a vinyl or vinylidene monomer containing ester groups, such as a (meth)acrylate ester, such as an ethylene/methyl acrylate (E/MA) or ethylene/ethyl acrylate (E/EA) copolymer, or a vinyl alkanoate, such as vinyl acetate, drastically reduces plate-out from the blend on molding, resulting in longer molding runs and fewer spoiled moldings. Similarly, replacement in an extrusion process results in less plate-out, as noted by better appearance of the sheet, longer runs without surface mar, and lack of buildup of polyolefin at the die lips.

Polyesters modified with larger amounts of ethylene/ester copolymers, additionally with nucleator, are known to the art, but are not taught in combination with the core/shell modifier and the polycarbonate of the present invention as being freer of plate-out and mold-release problems.

DETAILED DESCRIPTION OF THE INVENTION

In one aspect of the invention, we have discovered a rapid-crystallizing, modified polyester resin composition comprising:

1. A rapid-crystallizing modified polyester resin composition comprising:
   a. from about 70 to about 94%, preferably about 85% to about 90%, of a poly(ethylene terephthalate) resin having an intrinsic viscosity of from about 0.7 to about 1.1 dl./g.;
   b. from about 4 to about 29%, preferably from about 5 to about 10%, of a core/shell polymer having
      1. from about 60 to about 90% of a first elastomeric stage polymerized from a monomer system comprising
         a. at least about 75% of an alkyl acrylate preferably butyl acrylate, or of butadiene;
         b. optionally up to about 5% of a crosslinking monomer, preferably an alkylene glycol diacrylate or a polyol triacrylate;
         c. optionally up to about 5% of a graftlinking monomer, preferably allyl methacrylate or diallyl maleate;
      2. from about 10 to about 40 parts of a second rigid stage polymerized from a monomer system comprising at least 55% of an alkyl methacrylate wherein the alkyl group has from 1 to 4 carbon atoms;
      3. optionally up to about 5 weight percent of an inorganic nucleating agent, such as talc; and
      4. optionally up to about 5% of one or more thermal and/or oxidative stabilizers;
   c. from about 1 to about 8% of an aromatic polycarbonate, preferably bis-phenol-A polycarbonate; and
   d. from about 1 to about 5% of a copolymer of ethylene with a vinyl or vinylidene monomer containing ester groups, such as an alkyl acrylate such as methyl acrylate or ethyl acrylate, or a vinyl alkanoate, such as vinyl acetate, the ethylene content being less than about 99%, the copolymer containing no acid or acid salt functionality.

Preferably the core/shell polymer contains from about 10 to about 40 parts of a second rigid stage polymerized from a monomer system comprising essentially 100% of methyl methacrylate.

The invention further relates to the above compositions in the form of a rapidly-crystallizing sheet or molding.

The invention further relates to a process for producing a molding of a toughened poly(ethylene terephthalate) comprising:
   a. admixing 1. from about 70 to about 94% of a poly(ethylene terephthalate) resin having an intrinsic viscosity of from about 0.7 to about 1.1 dl./g.;
2. from about 4 to about 29% of a core/shell polymer having
   a. from about 60 to about 90% of a first elastomeric stage polymerized from a monomer system comprising
      i. at least about 75% of an alkyl acrylate or of butadiene;
      ii. optionally up to about 5% of a crosslinking monomer;
      iii. optionally up to about 5% of a graftlinking monomer;
   b. from about 10 to about 40 parts of a second rigid stage polymerized from a monomer system comprising at least 55% of an alkyl methacrylate wherein the alkyl group has from 1 to 4 carbon atoms;
   c. optionally up to about 5 weight percent of an inorganic nucleating agent; and
   d. optionally up to about 5% of one or more thermal and/or oxidative stabilizers;
3. from about 1 to about 8% of an aromatic polycarbonate; and
4. from about 1 to about 5% of a copolymer of ethylene with a vinyl or vinylidene monomer containing ester groups, the ethylene content being less than about 99%, the copolymer containing no acid or acid salt functionality;
   b. subjecting the mixture to conditions of heat and shear in an extruder sufficient to form a uniform melt;
   c. passing the melt through an extruder die to form a strand;
   d. cooling and cutting the strand to form pellets;
   e. subjecting the pellets to extruder conditions of heat and shear sufficient to reform the uniform melt;
   f. passing the uniform melt into a mold;
   g. cooling and releasing the molded object;
wherein the molded object exhibits less plate-out than an object molded similarly from the described formulation absent component a(4), the ethylene copolymer. The invention further relates to a process wherein similar components are processed in a similar way to produce a molded object exhibiting better release from the mold than an object molded similarly from the described formulation absent the ethylene copolymer component a(4).

Further, the invention relates to a process for producing an extrudate of a toughened poly(ethylene terephthalate) comprising treating an admixture of similar materials in a similar manner in an extruder, but passing the melt through an extruder die or die-lips to form a sheet, then optionally passing the sheet through shaping equipment, thermoforming dies, or onto calender rolls to form a finished shaped object wherein the extruded shaped object exhibits less plate-out than an object molded similarly from the described formulation absent the ethylene copolymer component a(4). All percentages are by weight and based on 100 parts of the composition or of the core/shell polymer, respectively.

By PET is meant condensation polymers formed by the reaction of ethylene glycol with terephthalic acid or a dialkyl terephthalate. Further are included copolymers containing small amounts of other glycols, such as propylene glycol, 1,4-butylene glycol, cyclohexane-1,4-dimethanol and the like, or of units derived from other related diacids, such as isophthalic acid, 2,6-napthalene dicarboxylic acid, and the like. One of ordinary skill in the art may readily select those copolymers which have a sufficiently high crystallization rate (related to PET "homopolymer") to be useful in forming crystallized molded or extruded articles.

The core/shell impact modifier of the invention is of a type well-known to the art. Normally they are formed in emulsion from a core polymer of an alkyl acrylate, such as butyl acrylate, 2-ethylhexyl acrylate, and the like, usually containing a crosslinking monomer, such as a glycol di(meth)acrylate, divinylbenzene, or the like to retain the dimensions of the core during processing and to increase the impact strength, and a graftlinking monomer, such as diallyl maleate, allyl (meth)acrylate, trisallyl cyanurate, and the like, to leave double bonds available for attachment of the later-polymerized shell to the core, thus improving the dispersion of the rubbery core in the matrix polymer. Typical of such core-shell polymers are those disclosed in Fromuth et al., U.S. Pat. No. 4,264,487.

The distinction between graftlinking monomers and crosslinking monomers may not be clean-cut, depending on relative reactivities of double bonds of these monomers with various core and shell monomers, and on the extent of conversion. Thus, in some instances, a crosslinking monomer may participate in grafting reactions, and a graftlinking monomer may cause the core to become crosslinked.

When polymers based on butadiene-rich cores are utilized, the presence of a graft-linking monomer is usually unnecessary. Cross-linking monomers may be utilized. Useful for the present purpose are homopolymers of butadiene, or copolymers of butadiene with up to 25% of co-monomers such as styrene, butyl acrylate, acrylonitrile, and the like. Typical of such core-shell polymers are those disclosed in Fromuth et al., U.S. Pat. No. 4,180,494.

The shell of the core/shell modifier may be a rigid polymer, that is, one with a glass temperature (as an isolated polymer apart from the core) of above room temperature. The shell will contain at least 55% of at least one alkyl methacrylate wherein the alkyl group is from 1 to 4 carbon atoms, such as methyl, ethyl, propyl, or butyl. Other co-monomers may be present, such as styrene, an alkyl acrylate, an aryl (meth)acrylate, (meth)acrylic acid, and the like. Preferred for ease of isolation of the resulting core/shell modifier, is an outer stage or shell polymer of methyl methacrylate homopolymer.

The rubbery core should be present as from about 60% to about 90% of the total core/shell polymer. The outer shell should comprise from about 10 to about 40 parts of the core/shell modifier. Intermediate shells, either rubbery or hard, may also be present. A butadiene//styrene//methyl methacrylate "three-stage" polymer such as taught in Ferry et al., U.S. Pat. No. 3,985,704, may be utilized in the present invention.

Since the core/shell polymer is separately isolated prior to forming the blend, such as by spray-drying, coagulation, and the like, it is convenient at that time to add the nucleating and thermal/oxidative stabilizers described below, especially as the thermal/oxidative stabilizer is generally required to protect the core/shell polymer. Core-shell polymers based on butadiene especially require such stabilization. However, it may be more convenient to add these components at the time the blend is formed and processed.

Nucleators may optionally be added, depending on the exact processing conditions to be used. Useful nucleators are inorganic compounds, such as talc, functionalized alumina, organic salts such as sodium salicylate, or certain organic polymers, such as poly(butylene terephthalate), certain polyolefins, polyamides, and the like.

Thermal/oxidative stabilizers are of several types: (a) organic phosphites, such as triphenyl phosphite, tris(nonylphenyl)phosphite, and the like, or other phosphorous "[cadi] acid based derivatives, such as taught in U.S. Pat. No. 3,953,539; (b) organic sulfur" compounds, such as dilauryl thiodipropionate, pentaerythritol tetra(thiodipropionate), alkyl esters of thioglycolic acid, and the like; (c) phenolic antioxidants based on hindered phenols, such as 2,6-di-t-butyl-4-methylphenol, octadecyl (3',5'-di-t-butyl-4'-hydroxyhydrocinnamate, and the like; (d) combinations, such as molecules containing both a hindered phenol and an S-alkylated thioester group. The stabilizers may also include a component, such as a trisaryl phosphite, which will prevent transesterfication reactions between the polyester and the polycarbonate.

The polycarbonate of the invention is normally bisphenol A polycarbonate, but other known polycarbonates, such as those based on bisphenol S, may be used.

The copolymer of ethylene with a vinyl or vinylidene monomer containing ester groups refers to a group of commercial or experimental polymers wherein the mol percent of the ester is generally below about 30%. The "monomer containing ester groups" refers to two general types of monomers:

(a) molecules where the copolymerizable double bond resides in the acid portion of the ester molecule, such as acrylate esters, methacrylate esters, maleic esters, itaconate esters, and the like. Preferred for their commercial availability are copolymers containing ethyl acrylate or methyl acrylate.

(b) molecules where the copolymerizable double bond resides in the alcohol portion of the molecule, such as vinyl alkanoates, isopropenyl alkanoates, and the like. Preferred because of commercial availability is vinyl acetate.

Experimentation has shown that these copolymers are more effective in preventing plate-out and encouraging mold release than are the prior art homopolymers of polyethylene, copolymers of ethylene with small amounts of polyolefin, or copolymers containing ethylene and an acid, such as (meth)acrylic acids, or salts thereof, the latter polymers being also known as ethylene ionomers.

It should be noted that certain of these copolymers, in the absence of the core/shell polymer, are still somewhat effective impact modifiers at room temperature. However, they degrade noticeably on re-processing of scrap, and require additional amounts of appropriate thermal stabilizers. On balance of processing, retention of properties on re-molding, and low temperature toughness, the blend of the present invention is preferred.

The blend of the present invention may further contain other impact modifiers, reinforcing fillers, lubricants, dyes, pigments, stabilizers, and the like. Such may be combined prior to melt-processing and/or during the melt-processing operation.

The blend may be melt-processed in conventional blending or molding equipment. It may be pre-pelletized by conventional extrusion/pelletization techniques and then re-molded or re-extruded by the ultimate user to form the desired object. Alternatively, the pre-mixed blend of ingredients may be melt-mixed and molded or extruded in one operation.

The blend may be molded into useful tough objects of good surface, for use in such applications as computer and business machine housings, automotive parts, and the like. It may also be extruded or molded into food containers which will exhibit sufficient toughness to be frozen and sufficient heat stability to be used in warming operations, such as in a microwave oven. Extruded sheets will exhibit good thermoformability, so they can be readily shaped by conventional thermoforming techniques into trays, containers, and the like.

Quantification of plate-out is difficult, and it may be necessary to rely on comparative experiments and the judgment of an experienced operator. Plate-out is a visual observation, either seen as a film on the mold surfaces or as defects in the molded object, and one test requires establishment of equilibrium molding conditions with a particular formulation and then a measurement of the number of moldings which can be made from various formulations before the mold must be cleaned. For extrudates, plate-out is usually observed at a die or at a pinch point, such as at a thermoforming roll or rolls, or orifice contacted by the warm or molten polymer. Build-up at thermoforming rolls is the most common observation, and again can be observed but not easily quantified, except the time the formulation can be run before re-cleaning is required. Surface gloss after a number of cycles or a set time of extrusion may also be employed.

EXPERIMENTAL

In the Examples and claims, all parts are parts by weight, and all percentages are percent by weight, except where noted for copolymers of ethylene, where percentages are expressed in mol percent.

Dry blends were made of the following compositions, wherein PET is a commercial poly(ethylene terephthalate), intrinsic viscosity=0.95, sold for use in molded crystallizable objects; the acrylic additive is a blend comprising 74.5 parts of a spray-dried core/shell impact modifier of the composition 80 (butyl acrylate 99/diallyl maleate 0.5/trimethylolpropane triacrylate 0.5//20 MMA; 19 parts of bisphenol-A polycarbonate; 1.5 parts of talc and 3.5 parts of a blend of phenolic and sulfur-containing thermal stabilizers (containing dilauryl thiodipropionate, tris(2,4-di-t-butylphenyl) phosphite and tetrakis(methylene (3,5-di-t-butyl-4-hydroxy-hydrocinnamate)methane; the polyolefin is linear low density polyethylene, containing a hindered phenol antioxidant; and the E/EA is a poly(ethylene/ethyl acrylate) copolymer, melt index 6.0, containing 18% ethyl acrylate.

The dry blends were dried at 70 degrees C. overnight, and extruded into pellets on a 25.4 mm. single screw extruder operating at 100 rpm, with barrel temperatures zone 1=243 degrees C., and zones 2-4=254 degrees C. The pellets were re-dried at 70 degrees C. overnight before molding.

The blends studied contained the following parts by weight of the indicated components:

| Blend | A | B | C | D | E |
|---|---|---|---|---|---|
| PET | 97 | 97 | 90 | 87 | 87 |
| Polyolefin | 3 | | | 3 | |
| E/EA | | 3 | | | 3 |

-continued

| Blend | A | B | C | D | E |
|---|---|---|---|---|---|
| Acrylic Additive | | | 10 | 10 | 10 |

Molding was performed in a Newbury molder and with a ASTM chromed, polished, mold for test parts for further physical testing by ASTM methods. Mold temperature was 140 degrees C.; the barrel temperatures were zone 1=266 degrees C.; zone 2=260 degrees C.; zone 3=254 degrees C.; zone 4=260 degrees C. The injection pressure was 150 psi (1.03 mPa); the cycle time was 25 seconds hold, and 25 seconds cool.

Mold release was judged by the operator on a scale of 1-5,5 being best. Plate-out was visually judged and the number of molding shots required before plate-out appeared was noted.

EXAMPLE 1

This experiment compares the performance of the polyolefin and the ethylene/acrylic copolymer in the absence of the acrylic additive. The blends are not tough enough for many packaging applications. The ethylene/ethyl acrylate copolymer additive is slightly better in resistance to plate-out, but neither additive exhibits a major plate-out problem.

| Blend | Mold release | Plate-out |
|---|---|---|
| A | 4 | Start at 20th shot |
| B | 4 | None after 25th shot |

EXAMPLE 2

In this experiment, the toughened blend (containing the acrylic additive) is shown to have poor mold release, but no plate-out problems. When the polyolefin, taught by Gartland et al., is added to the toughened blend, mold release is improved, but early plate-out is encountered. Upon replacement of the polyolefin, with the E/EA copolymer, greatly improved resistance to plate-out is seen.

| Blend | Mold release | Plate-out |
|---|---|---|
| C | 1 | No plate-out after 25 shots |
| D | 3 | Start at 3rd shot; very bad at 20th shot |
| E | 3 | Start at 22-25th shot; in repeat runs, none at 25th shot |

EXAMPLE 3

A copolymer of ethylene/methyl acrylate may be substituted for the ethylene/ethyl acrylate copolymer of Example 1 with similar improved results.

EXAMPLE 4

The butyl acrylate-based heteropolymer impact modifier of Example 1 may be replaced with an equal amount of a butadiene//styrene//methyl methacrylate copolymer as exemplified in U.S. Pat. No. 3,985,704 with similar improved results. The butadiene-based impact modifier is stabilized with about 3.5% by weight of a stabilizer combination claimed in U.S. Pat. No. 5,164,434.

We claim:

1. A rapid-crystallizing modified polyester resin composition comprising:
   a. from about 70 to about 94 weight percent of a poly(ethylene terephthalate) resin having an intrinsic viscosity of from about 0.7 to about 1.1 dl./g.;
   b. from about 4 to about 29 weight percent of a core/shell polymer having
      1. from about 60 to about 90 weight percent of a first elastomeric stage polymerized from a monomer system comprising
         a. at least about 75 weight percent of an alkyl acrylate or of butadiene;
         b. optionally up to about 5 weight percent of a crosslinking monomer;
         c. optionally up to about 5 weight percent of a graftlinking monomer;
      2. from about 10 to about 40 weight percent of a second rigid stage polymerized from a monomer system comprising at least 55 weight percent of an alkyl methacrylate wherein the alkyl group has from 1 to 4 carbon atoms;
      3. optionally up to about 5 weight percent of an inorganic nucleating agent; and
      4. optionally up to about 5 weight percent of one or more thermal and/or oxidative stabilizers;
   c. from about 1 to about 2 weight percent of an aromatic polycarbonate; the improvement comprising further addition of
   d. from about 1 to about 5 weight percent of a copolymer of ethylene with a vinyl or vinylidene monomer containing ester groups, the ethylene content being less than about 99 mol percent, the copolymer containing no acid or acid salt functionality.

2. The composition of claim 1 wherein the poly(ethylene terephthalate) is 85-90 weight percent of the total composition.

3. The composition of claim 1 wherein the aromatic polycarbonate is bisphenol-A polycarbonate.

4. The composition of claim 1 wherein the copolymer of ethylene with a vinyl or vinylidene monomer containing ester groups is a copolymer with methyl acrylate or ethyl acrylate.

5. The composition of claim 1 wherein the copolymer of ethylene with a vinyl or vinylidene monomer containing ester groups is a copolymer with a vinyl alkanoate.

6. The composition of claim 5 wherein the vinyl alkanoate is vinyl acetate.

7. The composition of claim 1 wherein the core/shell polymer from about 5 to about 10 weight percent of the composition.

8. The composition of claim 1 wherein the first elastomeric stage is polymerized from a monomer system comprising at least about 75 weight percent of butyl acrylate.

9. The composition of claim 1 wherein the crosslinking monomer is an alkylene glycol diacrylate.

10. The composition of claim 1 wherein the graftlinking monomer is allyl methacrylate or diallyl maleate.

11. The composition of claim 1 wherein the polymer contains from about 10 to about 40 weight percent of a final rigid stage polymerized from a monomer system comprising essentially 100 weight percent methyl methacrylate.

12. The composition of any of the above claims in the form of a rapidly-crystallizing sheet or molding.

13. A process for producing a molding of a toughened poly(ethylene terephthalate) comprising:
   a. admixing 1. from about 70 to about 94 weight percent of a poly(ethylene terephthalate) resin having an intrinsic viscosity of from about 0.7 to about 1.1 dl./g.;
2. from about 4 to about 29 weight percent of a core/shell polymer having
   a. from about 60 to about 90 weight percent of a first elastomeric stage polymerized from a monomer system comprising
      i. at least about 75 weight percent of an alkyl acrylate or of butadiene;
      ii. optionally up to about 5 weight percent of a crosslinking monomer;
      iii. optionally up to about 5 weight percent of a graftlinking monomer;
   b. from about 10 to about 40 weight percent of a second rigid stage polymerized from a monomer system comprising at least 55 weight percent of an alkyl methacrylate wherein the alkyl group has from 1 to 4 carbon atoms;
   c. optionally up to about 5 weight percent of an inorganic nucleating agent; and
   d. optionally up to about 5 weight percent of one or more thermal and/or oxidative stabilizers;
3. from about 1 to about 2 weight percent of an aromatic polycarbonate; and the improvement further comprising addition of
4. from about 1 to about 5 weight percent of a copolymer of ethylene with a vinyl or vinylidene monomer containing ester groups, the ethylene content being less than about 99 mol percent, the copolymer containing no acid or acid salt functionality;

b. subjecting the mixture to conditions of heat and shear in an extruder sufficient to form a uniform melt;
c. passing the melt through an extruder die to form a strand;
d. cooling and cutting the strand to form pellets;
e. subjecting the pellets to extruder conditions of heat and shear sufficient to reform the uniform melt;
f. passing the uniform melt into a mold;
g. cooling and releasing the molded object;
wherein the molded object exhibits less plate-out than an object molded similarly from the described formulation absent component a(4).

14. A process for producing a molding of a toughened poly(ethylene terephthalate) comprising:
a. admixing
   1. from about 70 to about 94 weight percent of a poly(ethylene terephthalate) resin having an intrinsic viscosity of from about 0.7 to about 1.1 dl./g.;
   2. from about 4 to about 29 weight percent of a core/shell polymer having
      a. from about 60 to about 90 weight percent of a first elastomeric stage polymerized from a monomer system comprising
         i. at least about 75 weight percent of an alkyl acrylate or of butadiene;
         ii. optionally up to about 5 weight percent of a crosslinking monomer;
         iii. optionally up to about 5 weight percent of a graftlinking monomer;
      b. from about 10 to about 40 weight percent of a second rigid stage polymerized from a monomer system comprising at least 55 weight percent of an alkyl methacrylate wherein the alkyl group has from 1 to 4 carbon atoms;
      c. optionally up to about 5 weight percent of an inorganic nucleating agent; and
      d. optionally up to about 5 weight percent of one or more thermal and/or oxidative stabilizers;
   3. from about 1 to about 2 weight percent of an aromatic polycarbonate; and the improvement further comprising addition of
   4. from about 1 to about 5 weight percent of a copolymer of ethylene with a vinyl or vinylidene monomer containing ester groups, the ethylene content being less than about 99%, the copolymer containing no acid or acid salt functionality;
b. subjecting the mixture to conditions of heat and shear in an extruder sufficient to form a uniform melt;
c. passing the melt through an extruder die to form a strand;
d. cooling and cutting the strand to form pellets;
e. subjecting the pellets to extruder conditions of heat and shear sufficient to reform the uniform melt;
f. passing the uniform melt into a mold;
g. cooling and releasing the molded object;
wherein the molded object exhibits better release from the mold than an object molded similarly from the described formulation absent component a(4).

15. A process for producing an extrudate of a toughened poly(ethylene terephthalate) comprising:
a. admixing
   1. from about 70 to about 94 weight percent of a poly(ethylene terephthalate) resin having an intrinsic viscosity of from about 0.7 to about 1.1 dl./g.;
   2. from about 4 to about 29 weight percent of a core/shell polymer having
      a. from about 60 to about 90 weight percent of a first elastomeric stage polymerized from a monomer system comprising
         i. at least about 75 weight percent of an alkyl acrylate or of butadiene;
         ii. optionally up to about 5 weight percent of a crosslinking monomer;
         iii. optionally up to about 5 weight percent of a graftlinking monomer;
      b. from about 10 to about 40 weight percent of a second rigid stage polymerized from a monomer system comprising at least 55 weight percent of an alkyl methacrylate wherein the alkyl group has from 1 to 4 carbon atoms;
      c. optionally up to about 5 weight percent of an inorganic nucleating agent; and
      d. optionally up to about 5 weight percent of one or more thermal and/or oxidative stabilizers;
   3. from about 1 to about 2 weight percent of an aromatic polycarbonate; and the improvement further comprising addition of
   4. from about 1 to about 5 weight percent of a copolymer of ethylene with a vinyl or vinylidene monomer containing ester groups, the ethylene content being less than about 99 mol percent, the copolymer containing no acid or acid salt functionality;
b. subjecting the mixture to conditions of heat and shear in an extruder sufficient to form a uniform melt;
c. passing the melt through an extruder die or die-lips to form a sheet;

d. optionally passing the sheet through shaping equipment, thermoforming dies, or onto calendar rolls to form a finished shaped object;

wherein the extruded shaped object exhibits less plate-out than an object molded similarly from the described formulation absent component a(4).

16. The composition of claim 1 wherein the inorganic nucleating agent is talc at about 0.15 weight percent.

17. The process of claims 13, 14, or 15, wherein the inorganic nucleating agent is talc at about 0.15 weight percent.

* * * * *

UNITED STATES PATENT AND TRADEMARK OFFICE
CERTIFICATE OF CORRECTION

PATENT NO. : 5,322,663

DATED : June 21, 1994

INVENTOR(S) : Choung-Houng Lai and Jean M. Brady

It is certified that error appears in the above-identified patent and that said Letters Patent is hereby corrected as shown below:

Column 8, line 59 should read:

Claim 11. The composition of claim 1 wherein the core/shell polymer contains from about 10 to about 40 weight percent of a final rigid stage polymerized from a monomer system comprising essentially 100 weight percent of methyl methacrylate.

Signed and Sealed this

Seventeenth Day of January, 1995

Attest:

BRUCE LEHMAN

Attesting Officer

Commissioner of Patents and Trademarks